(12) United States Patent
Heinrich et al.

(10) Patent No.: US 7,215,248 B2
(45) Date of Patent: May 8, 2007

(54) DIODE RECEIVER FOR RADIO FREQUENCY TRANSPONDER

(75) Inventors: Harley Kent Heinrich, Everett, WA (US); Daniel J. Friedman, Sleepy Hollow, NY (US)

(73) Assignee: Intermec IP Corp., Everett, WA (US)

( * ) Notice: Subject to any disclaimer, the term of this patent is extended or adjusted under 35 U.S.C. 154(b) by 372 days.

(21) Appl. No.: 10/770,341

(22) Filed: Feb. 2, 2004

(65) Prior Publication Data

US 2005/0001724 A1  Jan. 6, 2005

Related U.S. Application Data

(60) Division of application No. 10/440,492, filed on May 16, 2003, now abandoned, and a continuation-in-part of application No. 10/308,859, filed on Dec. 3, 2002, now abandoned, which is a continuation-in-part of application No. 10/162,418, filed on Jun. 4, 2002, now abandoned, which is a continuation of application No. 09/426,235, filed on Oct. 25, 1999, now Pat. No. 6,400,274, which is a continuation of application No. 09/321,986, filed on May 28, 1999, now abandoned, said application No. 09/426,235 is a continuation-in-part of application No. 09/227,768, filed on Jan. 8, 1999, now Pat. No. 6,243,013, said application No. 09/321,986 is a continuation-in-part of application No. 08/733,684, filed on Oct. 17, 1996, now Pat. No. 5,889,489, which is a continuation-in-part of application No. 08/521,898, filed on Aug. 31, 1995, now Pat. No. 5,606,323, said application No. 09/426,235 and a continuation-in-part of application No. 09/211,584, filed on Dec. 14, 1998, now abandoned, and a continuation-in-part of application No. 09/195,733, filed on Nov. 19, 1998, now abandoned, is a continuation-in-part of application No. 09/114,037, filed on Jul. 10, 1998, now abandoned, which is a continuation of application No. 08/626,820, filed on Apr. 3, 1996, now Pat. No. 5,850,181, said application No. 09/321,986 is a continuation-in-part of application No. 09/263,057, filed on Mar. 6, 1999, now abandoned, said application No. 09/321,986 is a continuation-in-part of application No. 09/266,973, filed on Mar. 12, 1999, now abandoned.

(60) Provisional application No. 60/430,553, filed on Dec. 3, 2002, provisional application No. 60/385,528, filed on Jun. 4, 2002, provisional application No. 60/086,972, filed on May 28, 1998, provisional application No. 60/077,872, filed on Mar. 13, 1998, provisional application No. 60/077,094, filed on Mar. 6, 1998.

(51) Int. Cl.
*G08B 13/14* (2006.01)

(52) U.S. Cl. .............................. 340/572.1; 340/572.5; 340/10.34

(58) Field of Classification Search ............. 340/572.1, 340/572.5, 572.7, 10.34
See application file for complete search history.

(56) References Cited

U.S. PATENT DOCUMENTS

| | | | | |
|---|---|---|---|---|
| 4,196,418 A | * | 4/1980 | Kip et al. | 340/10.34 |
| 5,266,926 A | * | 11/1993 | Beigel | 340/572.1 |
| 5,731,691 A | * | 3/1998 | Noto | 323/220 |
| 6,140,924 A | * | 10/2000 | Chia et al. | 340/572.5 |

* cited by examiner

*Primary Examiner*—John Tweel, Jr.

(57) ABSTRACT

A passive radio frequency transponder (RF tag) having a diode rectifier receiver circuit outside the tag power rectification circuit, the tag power rectification circuit supplying power to the electronics of the RF tag. An additional innovative low current circuit protect the signal capacitor from overvoltage produced by the signal diode. An innovative circuit also clips the signal and sharpens it. An innovative low current circuit is used as a comparator to sharpen the signal pulses.

17 Claims, 4 Drawing Sheets

DIODE RECEIVER FOR RADIO FREQUENCY TRANSPONDER

CROSS REFERENCE TO RELATED APPLICATIONS

The present application is a division of application Ser. No. 10/440,492, filed May 16, 2003, now abandoned, which claims benefit of U.S. provisional application No. 60/385,528, filed Jun. 4, 2002 and also claims benefit of U.S. provisional application No. 60/430,553, filed Dec. 3, 2002 and is a continuation-in-part of application Ser. No. 10/308,859, filed Dec. 3, 2002, now abandoned, which, in turn, is a continuation-in-part of application Ser. No. 10/162,418, filed Jun. 4, 2002, now abandoned, which, in turn, is a continuation of application Ser. No. 09/426,235, filed Oct. 25, 1999, now U.S. Pat. No. 6,400,274, which is a continuation of application Ser. No. 09/321,986, filed May 28, 1999, now abandoned, which claims benefit of U.S. provisional application No. 60/086,972, filed May 28, 1998. Said application Ser. No. 09/426,235 filed Oct. 25, 1999 is a continuation-in-part of application Ser. No. 09/227,768, filed Jan. 8, 1999, now U.S. Pat. No. 6,243,013 and said application Ser. No. 09/321,986 filed May 28, 1999 is a continuation-in-part of application Ser. No. 08/733,684, filed Oct. 17, 1996, now U.S. Pat. No. 5,889,489, which, in turn, is a continuation-in-part of application Ser. No. 08/521,898, filed Aug. 31, 1995, now U.S. Pat. No. 5,606,323. Said application Ser. No. 09/426,235 filed Oct. 25, 1999 is a continuation-in-part of application Ser. No. 09/114,037, filed Jul. 10, 1998, now abandoned, and is a continuation-in-part of application Ser. No. 09/195,733 filed Nov. 19, 1998, now abandoned, and is a continuation-in-part of application Ser. No. 09/211,584, filed Dec. 14, 1998, now abandoned which, in turn, is a continuation of application Ser. No. 08/626,820 filed Apr. 3, 1996, now U.S. Pat. No. 5,850,181. Said application Ser. No. 09/321,986 filed May 28, 1999 is a continuation-in-part of application Ser. No. 09/263,057, filed Mar. 6, 1999, now abandoned, which, in turn, claims benefit of U.S. provisional application No. 60/077,094, filed Mar. 6, 1998. Said application Ser. No. 09/321,986 is a continuation-in-part of application Ser. No. 09/266,973 filed Mar. 12, 1999, now abandoned, which, in turn, claims benefit of U.S. provisional application No. 60/077,872, filed Mar. 13, 1998.

Application No. 09/922,598 filed Dec. 29, 1998, U.S. Provisional application No. 60/070,347 filed Jan. 2, 1998, U.S. Provisional application No. 60/385,528 filed Jun. 4, 2002, U.S. Provisional application No. 60/430,553 filed Dec. 3, 2002, and U.S. Pat. Nos. 6,400,274, 6,243,013, 6,028,564, 6,097,347, 5,808,500, and 5,606,323 are each incorporated herein by reference in its entirety. All of the above patents and applications are hereby incorporated herein by reference in their entirety including incorporated material.

BACKGROUND OF THE INVENTION

The field of the invention is Radio Frequency (RF) transponders (RF Tags) which receive RF electromagnetic radiation from a base station and send information to the base station by modulating the load of an RF antenna.

RF Tags can be used in a multiplicity of ways for locating and identifying accompanying objects, items, animals, and people, whether these objects, items, animals, and people are stationary or mobile, and transmitting information about the state of the objects, items, and people. It has been known since the early 60's in U.S. Pat. No. 3,098,971 by K. M. Richardson, that electronic components on a transponder could be powered by (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own it is called a "passive" tag to distinguish it from an active tag containing a battery. The battery supplies energy to broadcast the information from the tag antenna. An active tag may also change the loading on the tag antenna for the purpose of transmitting information to the base station.

The "rebroadcast" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

A combination diode rectifier circuit and balanced modulator for modulating the antenna current at twice the carrier frequency was proposed by Gary T. Carroll in U.S. Pat. No. 4,724,427.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology. The use of the prior art transistor switches to change the loading of the transponder antenna and to receive information, however, leads to increased cost in the use of a totally integrated system consisting of a single chip connected to an antenna. The transistor switch of the prior art must be fast enough and have low capacitance to work well contained on a chip in a reasonable time. Such transistors lead to increased costs in the chip manufacturing, as the entire chip must be made with the same technology and the entire chip does not need the speed of the one transistor element. The range of the communication distance from the base station to the tag is critical. This range is determined by the voltage built up by the antenna and rectifying circuits on the tag. Passive RF tags must do two things which are incompatible. First, there must be a steady supply voltage extracted from the modulated RF field to power the devices on the tag. Second, there must be a data signal recovered from the modulated RF field which has well defined zeros and ones for use by the tag digital electronics. If the signal is taken off from the voltage on the main power supply capacitor of the tag, the voltage swing must be low to provide good power for the electronics, and high to provide good signal.

The information receiving sections of prior art RF tags draw down the main power supply capacitor which supplies power to the tag when no RF power is sent from the base station. This is wasteful of energy and useless, since there is no information to be received when the RF power is off.

Prior art tags have modulating circuits and receiver circuits which reduce the voltage which can be produced by the rectifier circuits. Prior art tags have circuits which require relatively high current, which reduces the voltage built up by the antenna and rectifying circuits on the tag.

RELATED APPLICATIONS

Copending patent applications assigned to the assignee of the present invention and hereby incorporated by reference, are:

application Ser. No. 08/303,965 filed Sep. 9, 1994 entitled RF Group Select Protocol, by Cesar et. al., (now U.S. Pat. No. 5,673,037);

application Ser. No. 08/304,340 filed Sep. 9, 1994 entitled Multiple Item RFID protocol, by Chan et. al. (now U.S. Pat. No. 5,550,547);

application Ser. No. 08/521,898 filed Aug. 31, 1995 entitled Diode Modulator for RF Transponder by Friedman et al. (now U.S. Pat. No. 5,606,323);

application Ser. No. 08/694,606 submitted Aug. 9, 1996 entitled RFID System with Broadcast Capability by Cesar et. al., (now U.S. Pat. No. 5,942,987); and application Ser. No. 08/681,741 submitted Jul. 29, 1996 entitled RFID transponder with Electronic Circuitry Enabling and Disabling Capability, by Heinrich et. al. (now U.S. Pat. No. 5,874,902).

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with maximum range. It is a further object of the invention to produce an RF transponder with circuits which require very little current. It is a further object of the invention to produce an electronic chip for an RF transponder which can be produced simply with standard semiconductor manufacturing techniques. It is a further object of the invention to produce a communication system for communicating with the RF transponder of the present invention. It is a further object of the invention to produce a system for controlling the communication system using the present invention. It is a further object of the invention to produce a system for using and changing information received from the transponder of the present invention.

SUMMARY OF THE INVENTION

The invention provides a diode receiver of a passive RF Transponder which is not part of the rectifier power supply circuit to measure the communication signal to the tag. The present invention has further advantages that the same rectification means used in the receiver circuit can also be used as a modulator. The present invention includes innovative protection means for protecting the receiver circuitry. The present invention includes innovative means for comparing a received analog signal with the moving average of the analog signal.

DETAILED DESCRIPTION OF THE INVENTION

Figure 1:
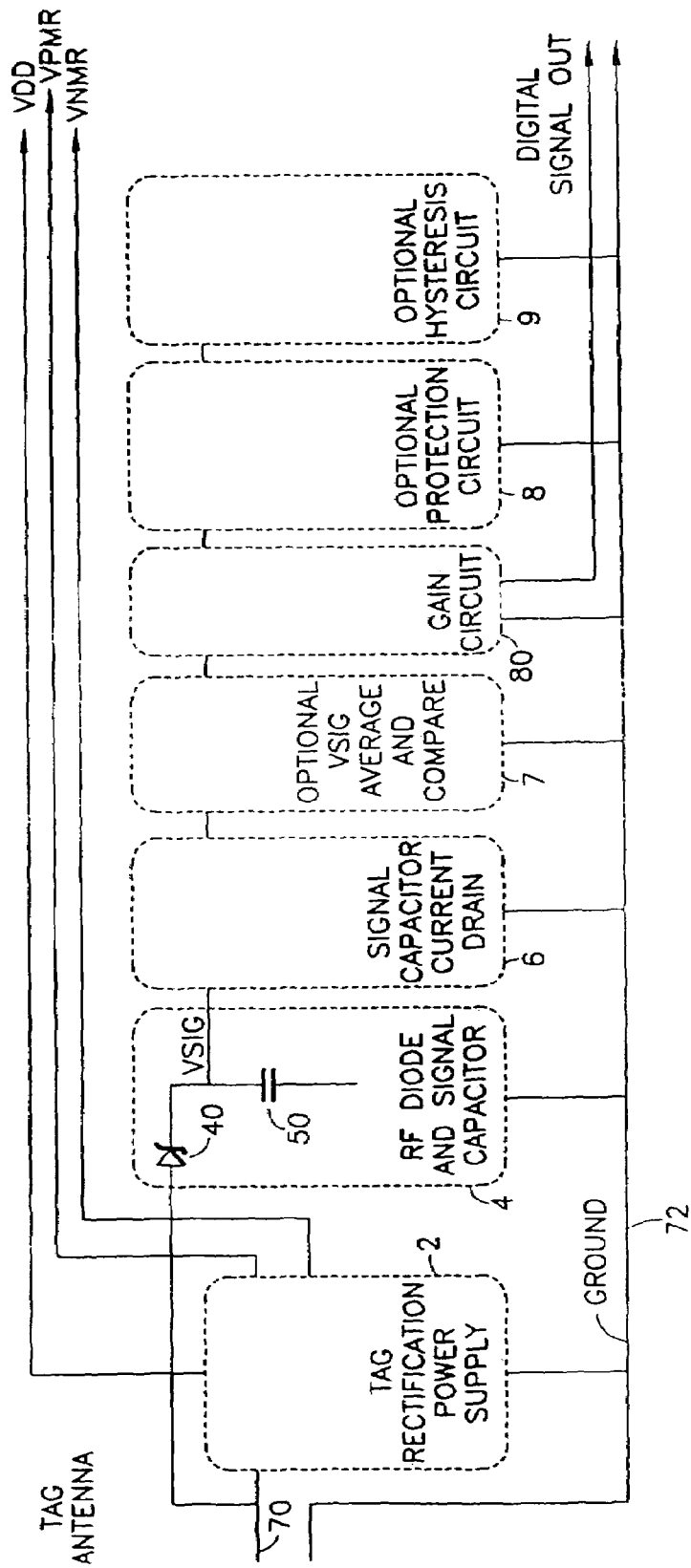
FIG. 1. A partial block diagram of the circuits of an RF tag.

The invention is to use a diode arrangement separate from the rectification section supplying power to the chip as sketched in FIG. 1.

FIG. 1. is a block diagram of a tag antenna 70, a tag rectification power supply 2, a tag receiving section 4, comprising an RF diode 40 and a tag signal capacitor 50, a tag signal capacitor drain section 6, and a gain section 80 for producing digital signals from the analog signal voltage VSIG produced across signal capacitor 50 by RF diode 40. Optional VSIG averaging and compare circuit 7, protection circuit 8, and hysteresis circuit 9 are also shown. Additional tag electronic components and memory elements are not shown.

Figure 2:
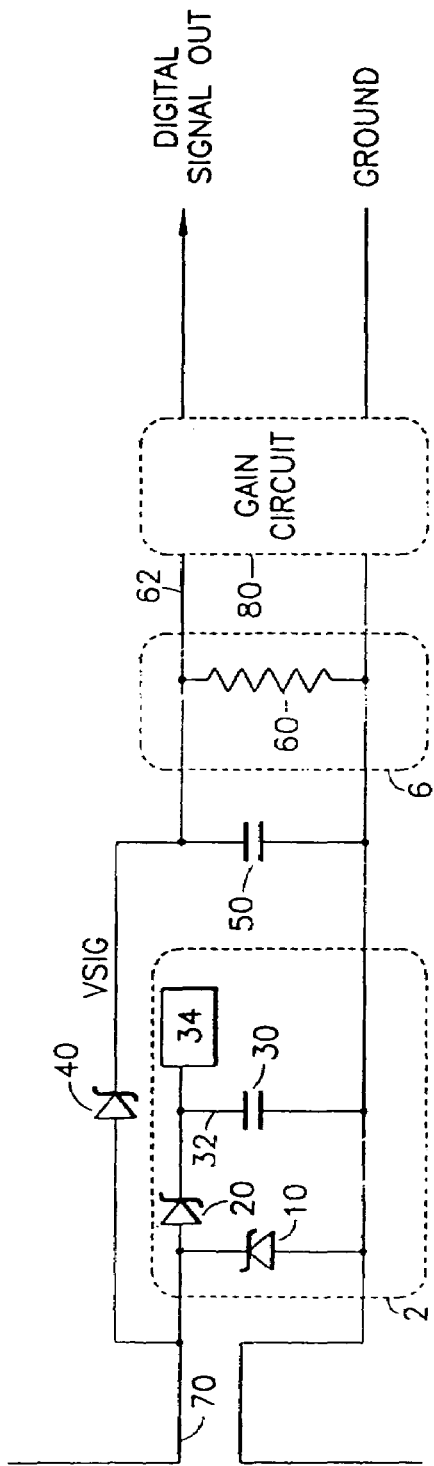
FIG. 2. Voltage doubling power supply for tag shown with diode receiver outside tag power circuit and with resistor as current drain.

The main power supply diodes 10 and 20 feed current to the main power supply capacitor 30 in block 2 in the voltage doubling scheme shown in FIG. 2. While a simple voltage rectification and doubling scheme is shown in the diagram, other full or partial wave rectification schemes as known in the art, and voltage doubling or other-voltage multiplication and addition schemes known in the art of power supplies, could be used as well. The raw power fed to capacitor 30 is conditioned by block 34 which has a voltage protection circuit and which supplies a steady and reliable chip power supply voltage VDD as output to run the tag electronics (The connections for powering the blocks are not shown). Several other voltage sources needed by the tag electronics may optionally be produced by the power supply 2. These are shown in FIG. 1 as VPMR and VNMR, and will be explained later.

RF Diode 40 which is separate from the tag power rectification circuit 2 feeds current to charge signal capacitor 50. The signal capacitor 50 charges up rapidly when the RF field (which is amplitude modulated) changes from the zero to the one state for on-off key signal modulation. (Amplitude modulation schemes where the RF carrier does not drop to zero are anticipated herein, but the examples given are for a 100% amplitude modulation of the carrier signal. Other modulation schemes such as phase and frequency modulation also anticipated.) The voltage VSIG which appears across the signal capacitor 50 is used to produce a digital signal. When the base station turns off the RF field in order to modulate the RF signal to send information to the tag, the charge stored in signal capacitor 50 is drained off by the signal capacitor current drain section 6, which in the embodiment of FIG. 2 comprises a resistor 60. The signal capacitor 50 does not then further drain current from the capacitor 30 during the time where the RF power is turned off, and the capacitor 30 can power circuits such as a clock circuit for a longer time than if the receiver circuit were draining current. The RC time constant for draining signal capacitor 50 must be short compared to the pulse length of the pulse modulation of the RF. If the RC time constant is long, the waveform recovered from the field modulation will be badly distorted, making it difficult to generate the correct recovered bit pattern on the chip. If the resistor 60 is very large, there is not much current draw to load down the antenna 70, but the time constant becomes long for a reasonable size signal capacitor 50. If signal capacitor 50 is too small, it does not act as an RF short, and RF can leak into the gain circuit 80 and perturb the tag electronics with unpredictable results. Furthermore, with a small signal capacitor 50, the circuit is more susceptible to noise and performance values vary strongly with parasitic capacitance changes. VSIG is sent to a gain circuit 80 via line 62 where it is turned into the clipped ones and zeros needed for the digital electronics circuits. Such methods of turning a modulated analog signal into a digital signal are well known to one skilled in the art.

The resimicrosecond time constant and a reasonable size signal capacitor 50 is also very expensive to build on a chip, because large resistors take up a lot of chip area. In addition, the current drain through a resistor will have a strong dependence on VSIG.

Figure 3:
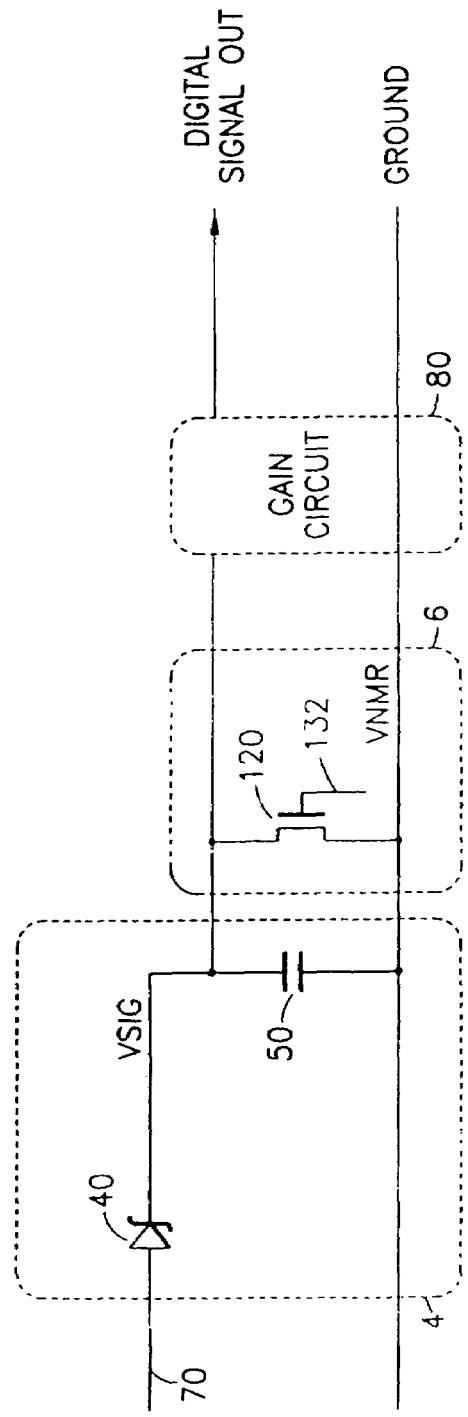
FIG. 3. Circuit for a preferred embodiment of the invention.

A more preferred embodiment of the invention is a novel circuit sketched in FIG. 3. In place of the resistor 60 used to drain down the signal capacitor 50 when the RF is shut off, the FET 120 is used. In contrast to the circuit of FIG. 2, a constant current is drawn through FET 120 independent of the voltage VSIG. The magnitude of the current through the n-FET 120 is determined by a voltage VNMR on line 132. VNMR is derived from a constant current source (not shown) in the power supply 2. Because the current is drawn from the signal capacitor 50 both when the RF field is on and when it is off, the amount of current drained by FET 120 must be chosen carefully. The current must be large enough for a quick discharge of signal capacitor 50 when the field turns off, yet small enough that the recharging of the power capacitor 30 is minimally affected when the field turns on. VNMR is produced by a well known technique of mirroring the current in a well known low current reference generator circuit. VNMR is very stable with respect to the circuit ground, and is relatively independent of the (possibly) fluctuating voltage VDD produced by the power rectification circuit of the tag. The current through n-FET 120 is thus determined by the current through another n-FET, the determination being made principally by the dimensional relationships of the two FETs.

Figure 4A:
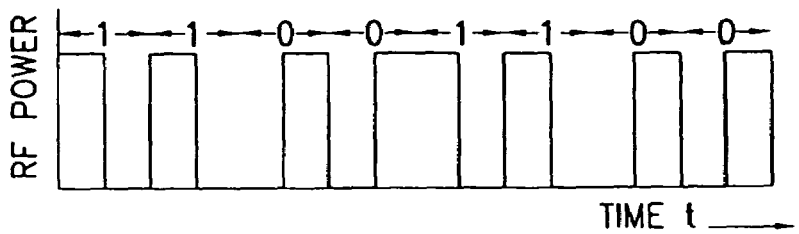
FIG. 4a. RF power sent to the tag vs time
Figure 4B:
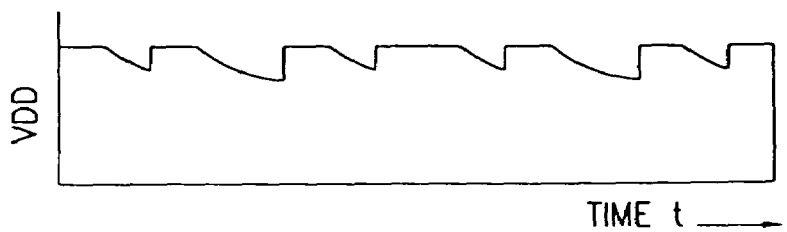
FIG. 4b. Voltage across power capacitor vs time.
Figure 4C:
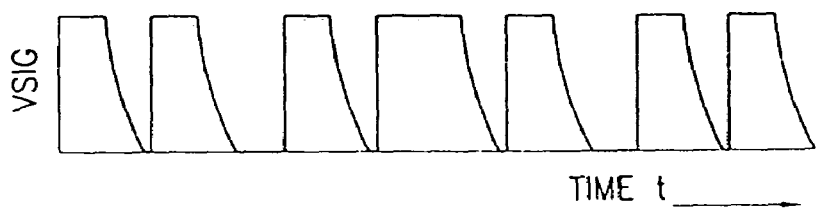
FIG. 4c. Raw signal voltage VSIG across signal capacitor vs time.
Figure 4D:
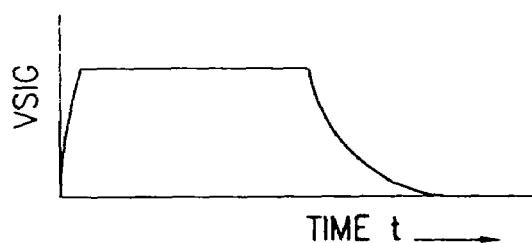
FIG. 4d. A time expanded sketch of the signal voltage VSIG across resistor current drain FIG. 4e. A time expanded sketch of the signal voltage VSIG across transistor current drain.
Figure 4E:
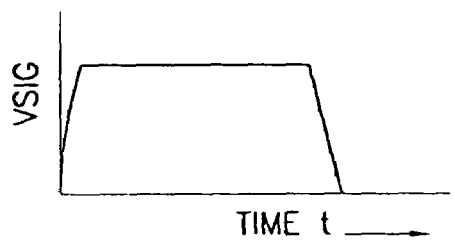
FIG. 4f. A time expanded sketch of the signal voltage VSIG with optional hysteresis circuit.
Figure 4F:
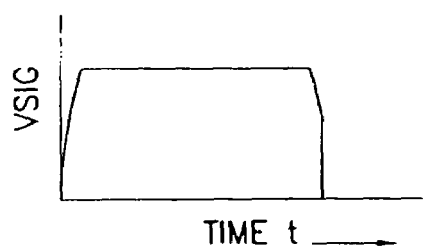

The modulated RF power sent to the tag is sketched in FIG. 4a, and the voltage VDD across the capacitor 30 is sketched in FIG. 4b. In the sample data pattern shown, data is Manchester encoded, meaning that the order of two half bits of different polarity determines the bit value being sent. Here, a half-bit 1 followed by a half-bit 0 denotes a 1 while a half-bit 0 followed by a half-bit 1 denotes a 0. The voltage across resistor 60 is the raw signal voltage VSIG which is sketched in FIG. 4c. FIG. 4d shows a time expanded sketch of the signal voltage VSIG across resistor 60 of FIG. 2, while FIG. 4e shows a time expanded sketch of the signal voltage VSIG when the n mirror FET 120 of FIG. 3 is used FIG. 4f is a time expanded sketch of the signal voltage VSIG when an optional hysteresis circuit 9, discussed later, is used with the n mirror controlled FET of FIG. 3.

The voltage VSIG is shown in FIG. 4d as a function of time for a single pulse with expanded time scale for the circuit shown in FIG. 2. Note that the falling edge of the pulse is an exponential with a time constant given by RC, where R is the resistance of resistor 60 and C is the capacitance of signal capacitor 50. In contrast, the voltage falls linearly with the circuit of FIG. 3, as sketched in curve 4e. The time taken for VSIG to reach zero is determined by VNMR. The transistor current drain 120 takes up much less space on the chip than a resistor which would give an adequate RC time constant.

Figure 5:
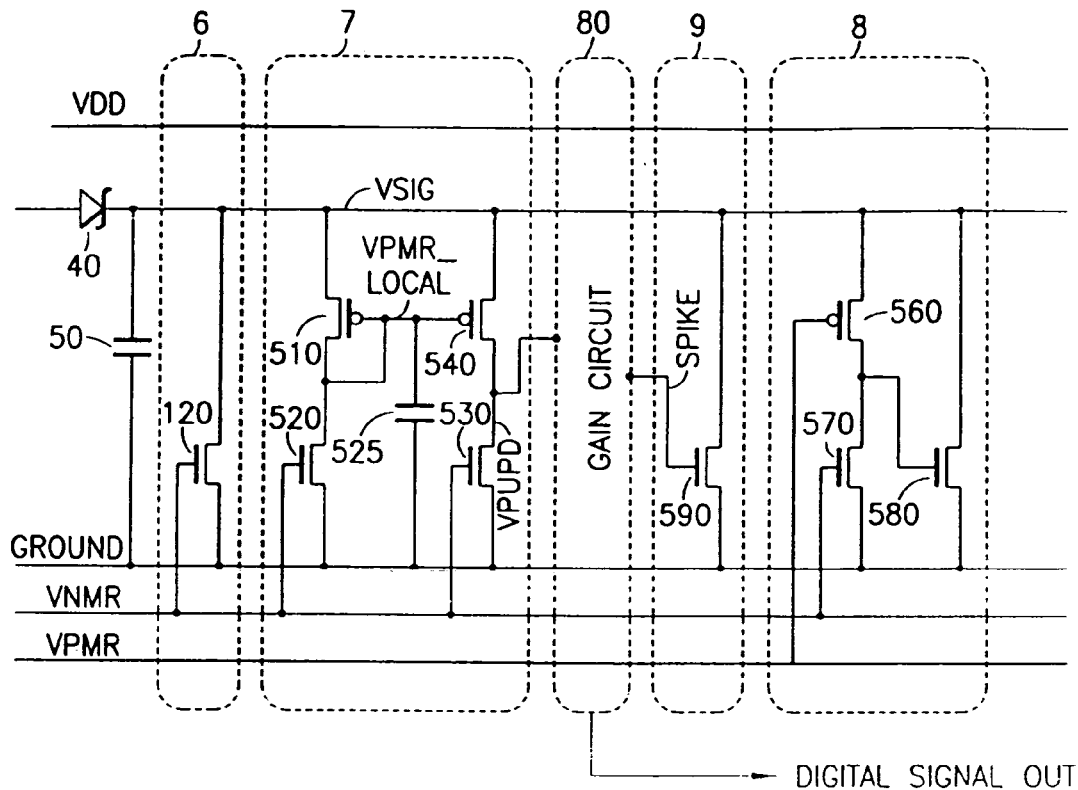
FIG. 5. A preferred embodiment of the invention.

An additional preferred embodiment of the invention is shown in FIG. 5. The voltage VSIG on signal capacitor 50 is averaged in an innovative way in block 7 over a time which may be comparable or may be short compared to an Rf modulation frequency half cycle. The instantaneous voltage VSIG is then compared in block 7 to this moving average and when the instantaneous voltage VSIG drops to some threshold compared to the moving average, the gain circuit 80 drains the signal capacitor 50 much faster than the transistor current drain 120 can to give a good falling edge to VSIG. The gain circuit 80 sends a spike voltage to transistor 590 in block 9 of FIG. 5. The novel method of taking the average sketched in FIG. 5 is preferred to a standard averaging circuit using a capacitor and a resistor which is well known in the art for the same reasons that the circuit of FIG. 3 is preferred. The circuit shown takes less chip area and is more controllable and less variable than the standard capacitor and resistor arrangement for averaging a voltage. The p-mirror set up shown in FIG. 5 uses p-FET 510 and a current defined by VNMR thorough the n-FET 520 to define a voltage VPMR_LOCAL, which is defined with respect to VSIG. The p mirror circuit shown is well known in the art as a way of defining a voltage with respect to another voltage which is not at ground potential. The averaging capacitor 525 charges and discharges relatively slowly, so that VPMR_LOCAL is related to a moving avenge of VSIG. VPMR_LOCAL is used to compare the present value of VSIG with its moving average in a voltage comparator pull up pull down circuit, where p-FET 540 is controlled by VPMR_LOCAL to pass twice the current as transistor 510 in saturation mode, and n-FET 530 is controlled by VNMR to pass the same current as transistor 510 in saturation mode. When VSIG is steady, the voltage VPUPD is high, since transistor 540 can supply twice the current that transistor 530 needs. However, when VSIG drops a by a percentage, preferably 25% and more preferably 10%, voltage VSIG minus voltage VPMR_LOCAL drops by a very much higher percentage, while VNMR is unchanged with respect to ground, and transistor 540 can not supply the current needed to transistor 530, so VPUPD drops rapidly to a very low value. The voltage VPUPD is then used by the gain stage 80 as the signal voltage.

An innovative optional protection circuit 8 is also shown in FIG. 5 to protect the signal path electronics 50, 7, 80, and 6. Since the diode 40 rectifying the incoming RF from the antenna 70 is not part of the chip power supply, the voltage VSIG may build up to large values if the tag is close to the base station. The signal capacitor 50 would then be at risk unless some means of protecting it such as protection circuit 8 were implemented. Protection circuit 8 is innovative in that it requires less current and much less space on the chip than the conventional protection circuits used for the main power section included in block 2. The voltages developed elsewhere on the chip can be used in a novel fashion to cut down the number of devices needed by the protection circuit. Block 2 provides a voltage VDD which powers the chip circuits, and VDD is regulated and limited Block 2 also contains a p mirror circuit which provides a voltage VPMR related to VDD and a n-mirror circuit which provides a voltage VNMR related to ground. VPMR controls the gate on the p mirror p-FET 560. If VSIG is less than or equal to VDD, FET 560 demands ¼ the current of 570; thus, the voltage on "shunt", the gate voltage of the high current FET 580, is low and FET 580 is off. If VSIG>VDD, by an amount on the order of tenths of a volt, (VSIG -VPMR) will be large enough to cause FET 560 to source more current than FET 570 can sink. Thus, the gate of the high current FET 580 will be pulled up, turning on FET 580 and acting to pull down VSIG, which will provide the desired protection. This protection circuit draws less than 50 nA when there is no overvoltage condition. The specific ratio of current demanded by FET 560 versus FET 570 when VSIG is less than or equal to VDD is not critical, but is preferably substantially less than 1. If the ratio is near or above 1, the shunt may turn on when VSIG is less than VDD, draining power from the field into the signal path unnecessarily.

An optional feedback circuit is shown as block 9 in FIG. 5 to provide a hysteresis in the signal measuring circuit. When the gain circuit 80 detects a falling edge on VSIG, circuit 80 provides a voltage pulse to a high current transistor 590 to short signal capacitor 50 to ground. The transistor 590 preferably can carry VSIG in this case is shown in FIG. 4f.

Figure 6:
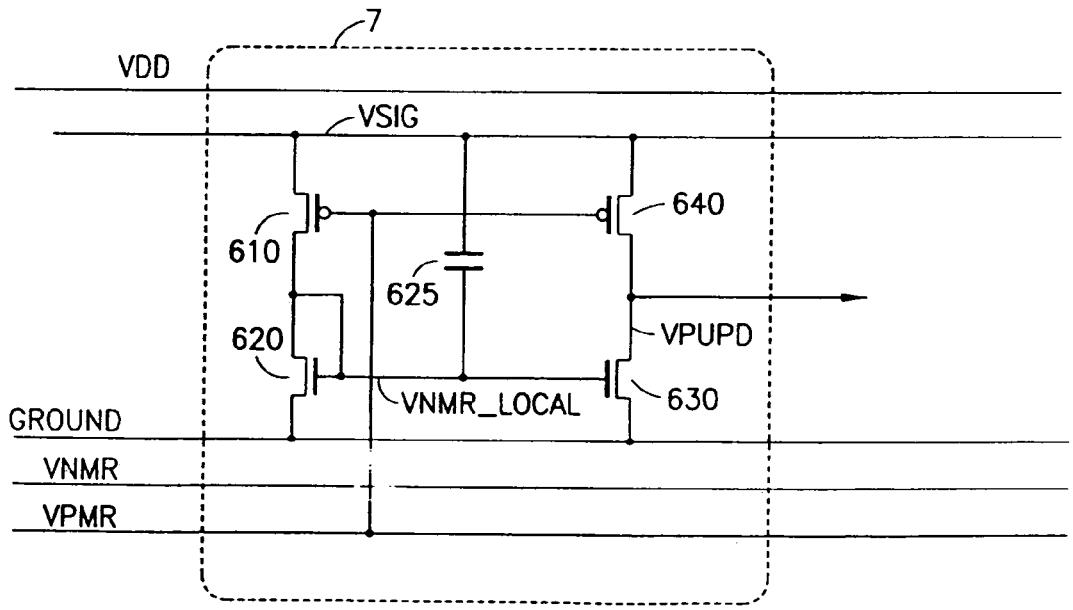
FIG. 6. An alternative implementation of a moving average circuit.

The p-channel transistors 510, 540, and 560 of FIGS. 5 and 610 and 640 of FIG. 6 may optionally have their n-wells connected to VSIG or VDD. There is less noise when the n-wells are connected to VDD. The n-channel transistors of FIG. 5 have their bulk contact connected to ground.

FIG. 6 shows an alternative implementation of a moving average circuit where the roles of the p-channel and n-channel devices have been reversed. Here, VPMR is used to generate VNMR_LOCAL for the moving average generation.

While the particular circuits shown in FIGS. 5 and 6 are preferred because they are particularly suited to low current operation and use the least number of devices and chip area possible, it is anticipated by the inventors that a number of equivalent circuits are possible which perform the same functions as the circuits shown. In particular, circuits where the roles of the p-channel devices and the n-channel devices are reversed are anticipated.

We claim:

1. A passive radio frequency (RF) transponder tag, comprising:
    a tag antenna for receiving RF power and modulated RF information signals sent to the tag by a base station;
    a tag voltage rectification power circuit attached to the tag antenna, the tag voltage rectification power circuit for receiving RF power from the antenna and for providing power to tag electronics, the tag electronics receiving power only from the tag voltage rectification power circuit; and
    a tag voltage rectification receiver circuit separate from the tag voltage rectification power circuit, the voltage rectification receiver circuit for receiving modulated RF signals from the antenna and for providing demodulated information signals to the tag electronics.

2. The radio frequency (Rf) transponder tag of claim 1, wherein the tag voltage rectification receiver circuit comprises:
    an RF diode, a first terminal of the RF diode attached to a first terminal of the antenna;
    a signal capacitor attached between a second terminal of the RF diode and a second terminal of the antenna; and
    a resistor connected in parallel to the signal capacitor.

3. A passive radio frequency (RF) transponder tag, comprising:
    a tag antenna for receiving RF power and modulated RF information signals sent to the tag by a base station;
    a tag voltage rectification power circuit attached to the tag antenna, the tag voltage rectification power circuit for receiving RF power from the antenna and for providing power to tag electronics, the tag electronics receiving power only from the tag voltage rectification power circuit; and
    a tag voltage rectification receiver circuit comprising a rectifier separate from the tag voltage rectification power circuit, the voltage rectification receiver circuit for receiving modulated RF signals from to antenna and for providing demodulated information signals to the tag electronics.

4. The radio frequency (RF) transponder tag of claim 3, wherein the tag voltage rectification receiver circuit comprises:
    an RF diode, a first terminal of the RF diode attached to a first terminal of the antenna;
    a signal capacitor attached between a second terminal of the RF diode and a second terminal of the antenna; and
    a resistor connected in parallel to the signal capacitor.

5. The radio frequency (RF) transponder tag of claim 3, wherein the rectifier comprises:
    an RF diode, a first terminal of the RF diode attached to a first terminal of the antenna;
    a signal capacitor attached between a second terminal of the RF diode and a second terminal of the antenna, and
    a transistor current drain connected in parallel to the signal capacitor.

6. The radio frequency (RF) transponder tag of claim 5, wherein the transistor current drain limits the current drained from the signal capacitor to a defined current.

7. The radio frequency (RF) transponder tag of claim 5, wherein the transistor current drain is an n channel transistor connected as an n mirror transistor.

8. The radio frequency (RF) transponder tag of claim 5, wherein the signal capacitor is protected against overvoltage by a low current protection circuit connected in parallel wit the signal capacitor.

9. The radio frequency (RF) transponder tag of claim 8, wherein the low current protection circuit draws less that fifty nanoamperes (50 nA) when there is not overvoltage on the signal capacitor.

10. The radio frequency (RF) transponder tag of claim 8, where in the low current protection circuit comprises:

a high current transistor connected in parallel wit signal capacitor, a first and second low current transistor connected in series, each transistor having a different saturation current, the first and second low current transistors connected in series being connected in parallel with the signal capacitor, wherein a voltage at the connection between the first and a second low current transistor controls the high current transistor to carry high current to protect the signal capacitor during overvoltage conditions, and to carry very little current in a condition of no overvoltage.

11. The radio frequency (RF) transponder tag of claim 5, wherein an instantaneous voltage on the signal capacitor is compared to a moving average of the instantaneous voltage on the signal capacitor.

12. The radio frequency (RF) transponder tag of claim 11, wherein the signal capacitor is shorted out when the instantaneous voltage on the signal capacitor is significantly less than the moving average of the instantaneous voltage of the signal capacitor.

13. The radio frequency (RF) transponder tag of claim 11, further comprising a moving average comparison circuit comprising:

a series connected first and a second transistor connected in parallel with the signal capacitor, the second transistor with its drain connected to the gate and drain of the first transistor, the gate of the second transistor connected to a mirroring reference voltage, the source of the second transistor connected to the second terminal of the antenna, and the source of the first transistor connected to the second terminal of the RF diode;

an averaging capacitor connected between the drain of the second transistor and the second terminal of the antenna; and a series connected third and a fourth transistor connected in parallel with the signal capacitor, the third and the fourth transistors having different saturation currents, the gate of third transistor connected to the gate of the first transistor, the drain of the third transistor connected to the drain the fourth transistor, the source of the third transistor connected to the second terminal of the RF diode, and the source of the fourth transistor connected to the second terminal of the antenna.

14. The radio frequency (RF) transponder tag of claim 11, further comprising a moving average comparison circuit comprising:

a series connected first and a second transistor connected in parallel with the signal capacitor, the drain of the first transistor connected to the gate and drain of the second transistor, the gate of the first transistor connected to a mirroring reference voltage, the source of the first transistor connected to the second terminal of the RF diode, and the source of the second transistor connected to the second terminal of the antenna;

an averaging capacitor connected between the drains of the first and second transistors and the second terminal of the RF diode;

a series connected third and a fourth transistor connected in parallel with the signal capacitor, the third and fourth transistors having different saturation currents, the gate of the third transistor connected to the gate of the first transistor, the drain of the third transistor connected to the drain of the fourth transistor, the source of the third transistor connected to the second terminal of the RF diode, the gate of the fourth transistor connected to the gate of the second transistor, and the source of the fourth transistor connected to the second terminal of the antenna.

15. The radio frequency (RF) transponder tag of claim 5, wherein the signal capacitor is shorted out when the tag electronics detects a falling edge on the signal of the signal capacitor.

16. The radio frequency (RF) transponder tag of claim 15, further comprising a signal capacitor shorting circuit comprising:

a high current transistor connected in parallel with the signal capacitor, and an edge detection circuit which generates a spike on falling edges detected on the signal at the second terminal of the RF diode, the spike output of the edge detection circuit connected to the gage of the high current transistor.

17. A passive radio frequency (RF) transponder (tag) comprising:

a tag antenna for receiving RF power and modulated RF information signals sent to the tag by a base station;

a tag voltage rectification power circuit attached to the tag antenna, the tag voltage rectification power circuit for receiving RF power from the antenna and for providing power to tag electronics, the tag electronics receiving power only from the tag voltage rectification power circuit; and a rectifier separate from the tag voltage rectification power circuit for receiving modulated RF signals from the antenna and for providing demodulated information signals to the tag electronics.

* * * * *